UNITED STATES PATENT OFFICE.

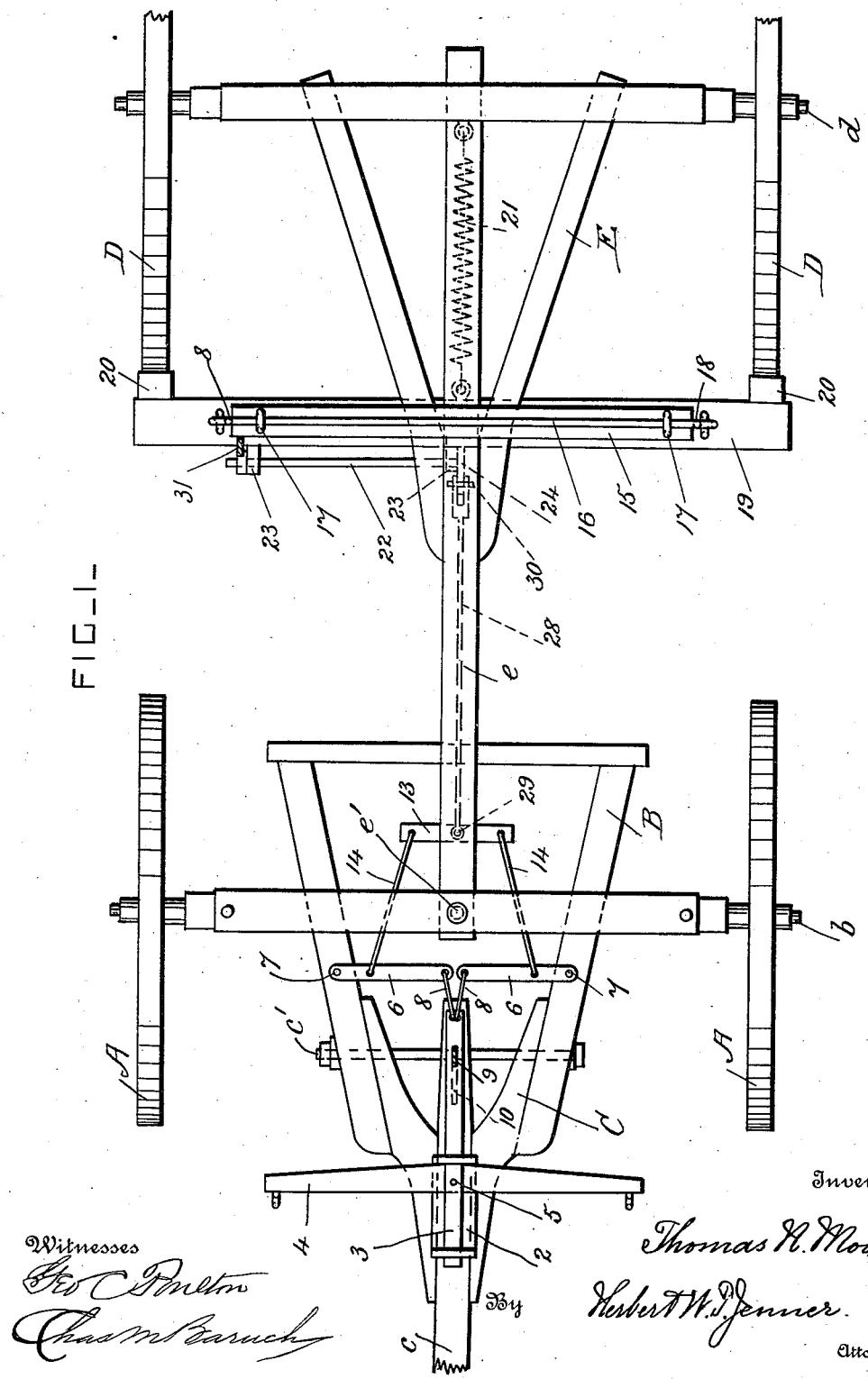

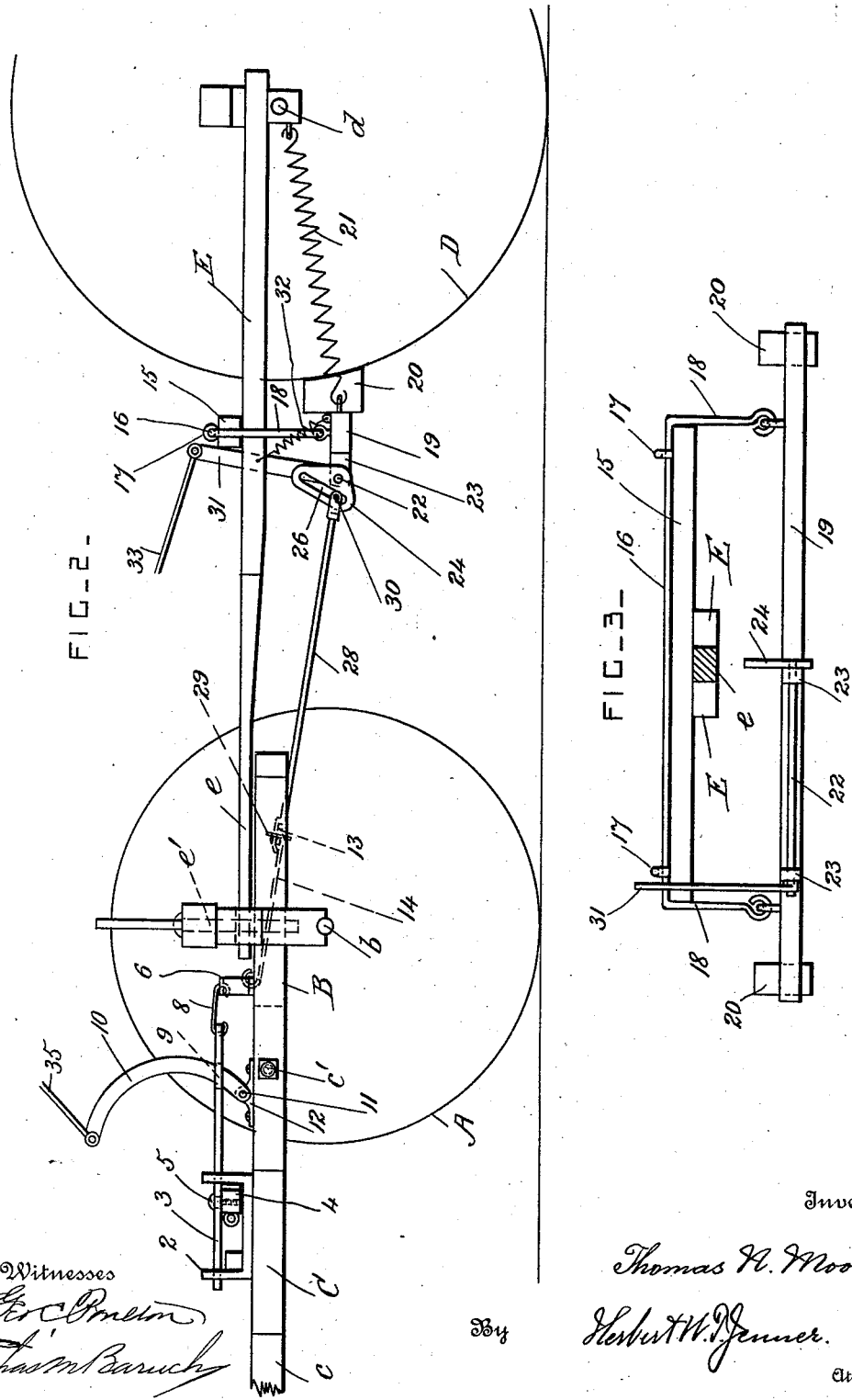

THOMAS N. MOORE, OF COLEMAN, OKLAHOMA.

WAGON-BRAKE.

1,019,176.　　　Specification of Letters Patent.　　Patented Mar. 5, 1912.

Application filed June 7, 1911. Serial No. 631,866.

*To all whom it may concern:*

Be it known that I, THOMAS N. MOORE, a citizen of the United States, residing at Coleman, in the county of Johnston and State of Oklahoma, have invented certain new and useful Improvements in Wagon-Brakes; and I do hereby declare the following to be a full, clear, and exact description of the invention, such as will enable others skilled in the art to which it appertains to make and use the same.

This invention relates to brakes for wagons and other similar vehicles; and it consists in the novel construction and combination of the parts hereinafter fully described and claimed.

In the drawings, Figure 1 is a plan view of a wagon having a brake constructed according to this invention. Fig. 2 is a side view of the same. Fig. 3 is a front view of the brake-beam and rock-shaft.

A are the front road wheels mounted on a front axle $b$ secured to the front frame B. C are the hounds provided with a draft-pole $c$ and pivoted to the front frame by a pin $c'$. D are the rear road wheels mounted on a rear axle $d$ secured to the rear frame E which is provided with a reach $e$, the front end of which is pivoted to the front frame B by a vertical pin $e'$. All of these parts are of any approved construction.

A bracket or guide 2 is secured to the upper side of the draft-pole, and 3 is a bar which is slidable longitudinally in the bracket or guide 2. A whiffletree or draft appliance 4 is pivoted to the bar 3 by a pin 5, and the team is harnessed to this whiffletree in the usual manner. Two similar levers 6 are pivoted by pins 7 to the side portions of the front frame, and the adjacent end portions of these levers are coupled to the rear end of the bar 3 by two connecting-rods 8 so that the hounds can move pivotally.

The bar 3 has a slot 9, and 10 is a lever pivoted by a pin 11 to a bracket 12 on the pole below the bar. The lever 10 projects upwardly through the slot 9 and it is preferably curved, and it affords a means for sliding the bar 3 by hand. A rod 35 is provided for working the lever 10 from a distance and is pivoted to the said lever. An equalizing bar 13 is arranged on the opposite side of the front axle from the levers 6, which are pivoted in the space between the front axle and the hounds, and 14 are connecting-rods which couple the ends of the equalizing bar 13 with the middle parts of the levers 6. The connecting-rods 14 are arranged one on each side of the reach pin $e'$, and the equalizing bar 13 is arranged below the reach.

A crossbar 15 is secured to the rear frame E and the reach, and 16 is a shaft journaled in bearings 17 secured to the crossbar 15 and having arms 18 at its ends. The brake-beam 19 is suspended pivotally from the arms 18, which normally hang vertical, and 20 are brake-blocks on the end portions of the brake-beam. The brake-blocks 20 are pressed against the rear road wheels by a spring 21 arranged between the middle part of the brake-beam and the rear axle.

A rock-shaft 22 is arranged at the front side of the brake-beam and is journaled in bearings 23. A plate 24 is secured to the end of the rock-shaft 22 opposite the middle part of the brake-beam, and this plate has a slot 26 which is normally held in an upwardly and rearwardly inclined position with its lower or inner end portion in advance of its outer end portion. A rod 28 for releasing the brake is pivoted to the middle part of the equalizing bar 13 by a pin 29, and 30 is a pin which couples the rear end of the brake-releasing rod 28 with the plate 24 and which is slidable in the slot 26. A hand lever 31 is secured to the other end of the rock-shaft 22 from the plate, and 32 is a spring secured between the brake-beam and the lever 31, and which normally holds the lever 31 in an upwardly and rearwardly inclined position. A rod 33 is provided for working the lever 31 from a distance, and is pivoted to the said lever. The two levers 31 and 10 can be operated by hand, or they may have any approved form of treadles or other attachments connected to their operating rods to enable them to be worked by foot. The brake blocks are applied to the rear wheels by the spring 21 when the wagon is going downhill, and they are released automatically by the pull of the team on the whiffletree 4 and bar 3 when the wagon is being drawn on level ground or uphill. The lever 10 affords a means for releasing the brakes when the wagon is backed. The bracket or guide 2 limits the motions of the bar 3, as the whiffletree comes in contact with its end portions. The lever 31 enables the brake to be operated by hand when the team runs away.

When the lever 31 is moved forwardly, it turns the plate 24 so that the slot 26 is horizontal. This permits the whiffletree to bear against the front end of the bracket or guide 2, and the spring 21 then applies the brake-blocks to the rear road wheels.

What I claim is:

1. The combination, with a frame, an axle, and road wheels; of a brake-beam suspended from the said frame and provided with brake-blocks, a spring for pressing the brake-blocks on the said wheels, a rock-shaft pivotally supported from the brake-beam, a plate secured to the rock-shaft and provided with a slot, a spring normally holding the said plate with the inner end of its slot in advance of its outer end, a brake-releasing rod provided with a pin which is slidable in the said slot and which normally engages with its inner end, means for limiting the forward movement of the said rod, and a lever secured to the rock-shaft and adapted to move the outer end portion of the said slot to a position in advance of its inner end to neutralize the action of the brake-releasing rod in an emergency.

2. The combination, with a front frame provided with a draft-pole, a front axle, and front road wheels; and a rear frame provided with a reach connected to the front frame, a rear axle, and rear road wheels; of a brake-beam suspended from the rear frame and provided with brake-blocks, a spring for pressing the brake-blocks on the rear wheels, a brake-releasing rod operatively connected with the brake-beam at a point below the reach, a guide secured to the said draft-pole, a bar slidable longitudinally in the said guide, a draft appliance connected to the said bar, levers having their outer ends pivoted to the sides of the front frame, connections between the adjacent ends of the said levers and the said bar, an equalizing bar arranged below the said reach and having its middle part pivoted to the front end portion of the brake-releasing rod, and connections between the middle parts of the said levers and the end portions of the said equalizing bar.

3. The combination, with a front frame provided with a draft-pole, a front axle, and front road wheels; and a rear frame provided with a reach connected to the front frame, a rear axle, and rear road wheels; of a brake-beam suspended from the rear frame and provided with brake-blocks, a spring for pressing the brake-blocks on the rear wheels, a rock-shaft pivotally supported from the brake-beam, a plate secured to the rock-shaft and provided with a slot, a spring normally holding the said plate with the inner end of its slot in advance of its outer end, a brake-releasing rod provided with a pin which is slidable in the said slot and which normally engages with its inner end, a guide secured to the said draft-pole, a bar slidable longitudinally to a limited extent in the said guide, a draft appliance connected to the said bar, levers having their outer ends pivoted to the sides of the front frame, connections between the adjacent ends of the said levers and the said bar, and connections between the middle parts of the said levers and the front end of the brake-releasing rod.

In testimony whereof I have affixed my signature in the presence of two witnesses.

THOMAS N. MOORE.

Witnesses:
  W. H. EVANS,
  C. D. PRICE.